Nov. 10, 1931.   L. G. SIMJIAN   1,830,770
POSE REFLECTING SYSTEM FOR PHOTOGRAPHIC APPARATUS
Filed May 16, 1929   3 Sheets-Sheet 1

INVENTOR
LUTHER G. SIMJIAN
By Seymour, Earle & Nichols
ATTORNEYS

Nov. 10, 1931.  L. G. SIMJIAN  1,830,770
POSE REFLECTING SYSTEM FOR PHOTOGRAPHIC APPARATUS
Filed May 16, 1929   3 Sheets-Sheet 2
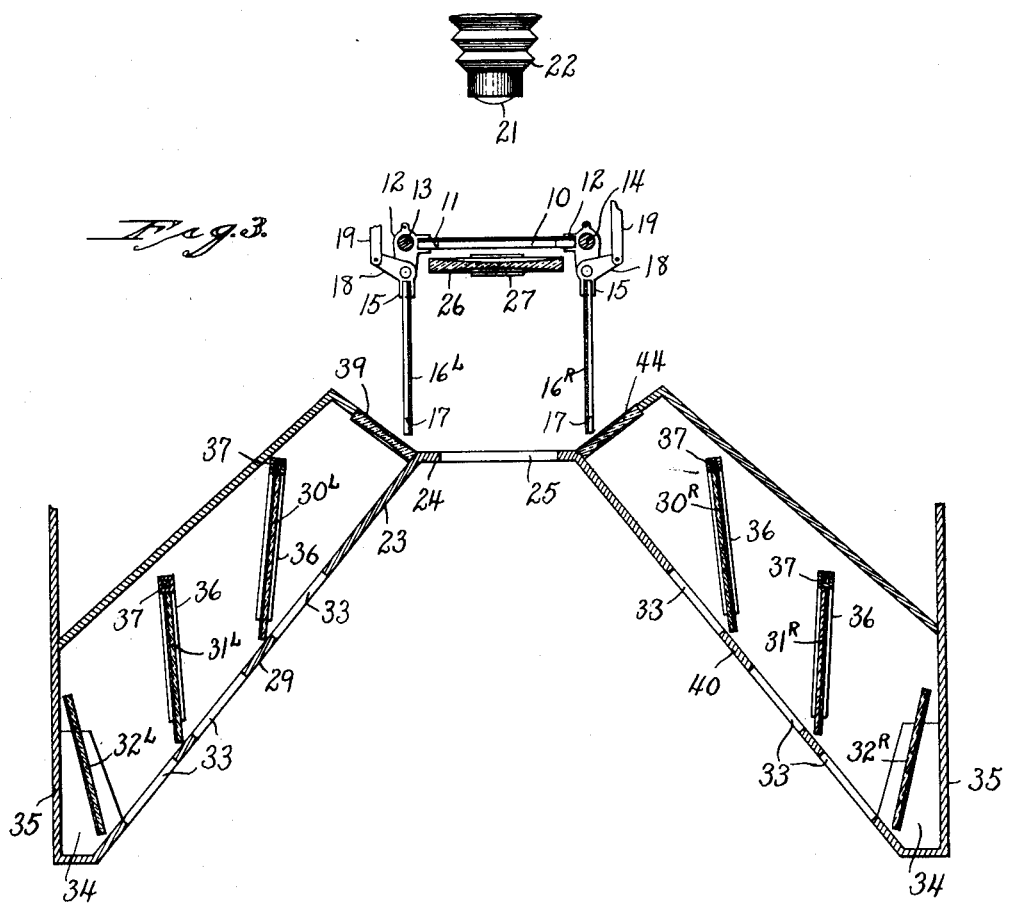
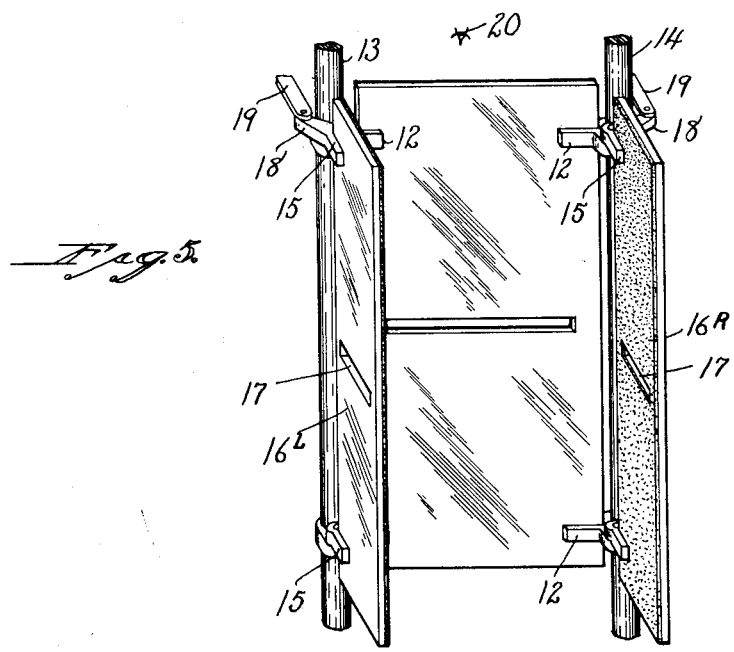
INVENTOR
LUTHER G. SIMJIAN
BY Seymour, Earle + Nichols
ATTORNEYS Nov. 10, 1931.    L. G. SIMJIAN    1,830,770
POSE REFLECTING SYSTEM FOR PHOTOGRAPHIC APPARATUS
Filed May 16, 1929    3 Sheets-Sheet 3
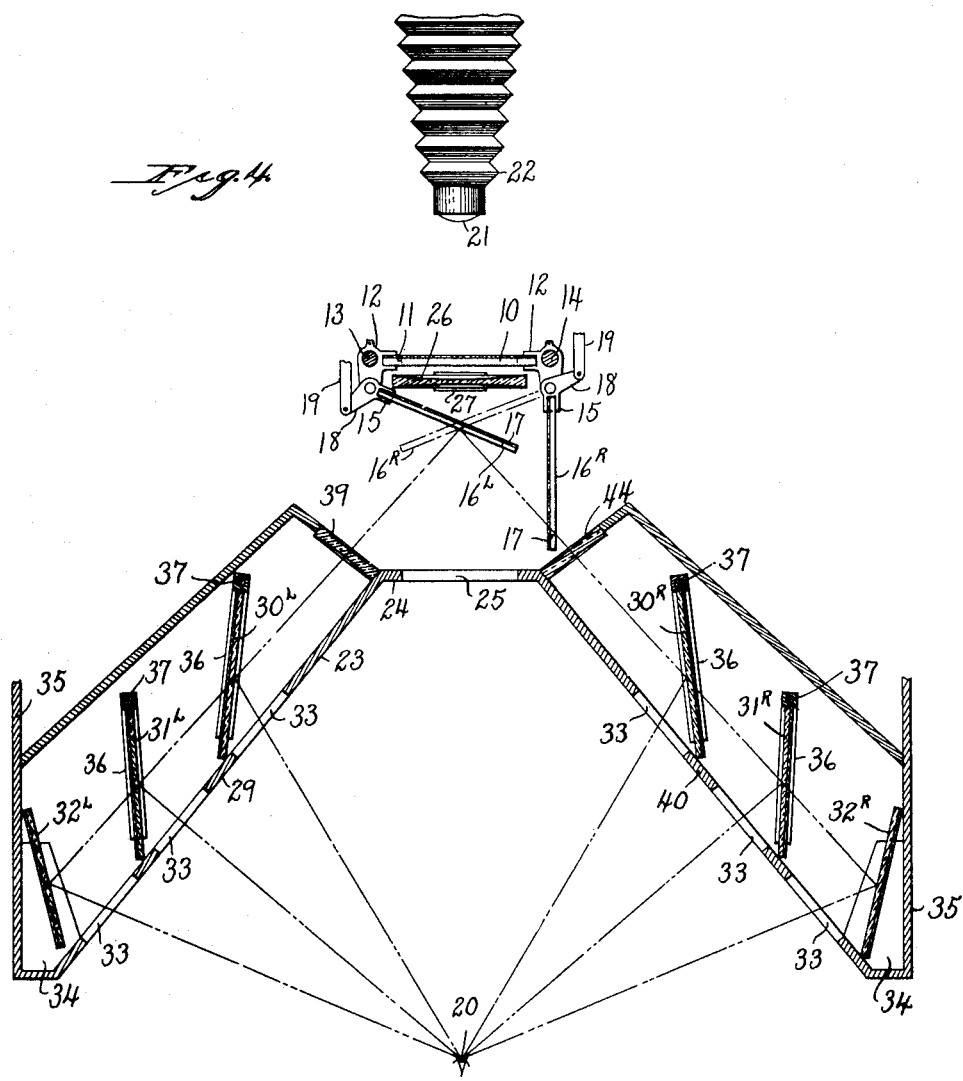

Patented Nov. 10, 1931

1,830,770

UNITED STATES PATENT OFFICE

LUTHER G. SIMJIAN, OF NEW HAVEN, CONNECTICUT

POSE-REFLECTING SYSTEM FOR PHOTOGRAPHIC APPARATUS

Application filed May 16, 1929. Serial No. 363,447.

This invention relates to an improvement in pose-reflecting systems for photographic apparatus and particularly to pose-reflecting systems designed for use in connection with automatic and semi-automatic photographic machines but not so limited, and constitutes an improvement over the structures shown in my co-pending application, filed October 21, 1927, Serial No. 227,731, and United States Patent No. 1,709,598, granted to me April 16, 1929.

The object of this invention is to provide a superior and accurate pose-reflecting system for photographic apparatus which will enable a person being photographed to observe before his photograph is taken the reflection of substantially the identical profile or semi-profile of himself which the camera will record when the same is operated.

A further object of my invention is to provide a pose-reflecting system of the type described in which the poser may readily and conveniently observe a reflection of any one of a variety of poses which the camera will record.

With the above objects in view, my invention consists in a pose-reflecting system for photographic apparatus characterized by one or more image-deflecting mirrors mounted for bodily movement and for swinging movement in a horizontal plane, and one or more sight-mirrors located forward and to one side of the image-deflecting mirrors in position to reflect an image received from the latter to the poser.

My invention further consists in a pose-reflecting system for photographic apparatus characterized as above and having certain other details of construction and arrangements of parts as will be hereinafter described and particularly recited in the claims.

In the accompanying drawings:

Fig. 3 is a broken schematic horizontal section thereof, with the vertically-movable mirror-unit, comprising the pose-reflecting mirror and the two image-deflecting mirrors, shown in plan;

Figure 1:
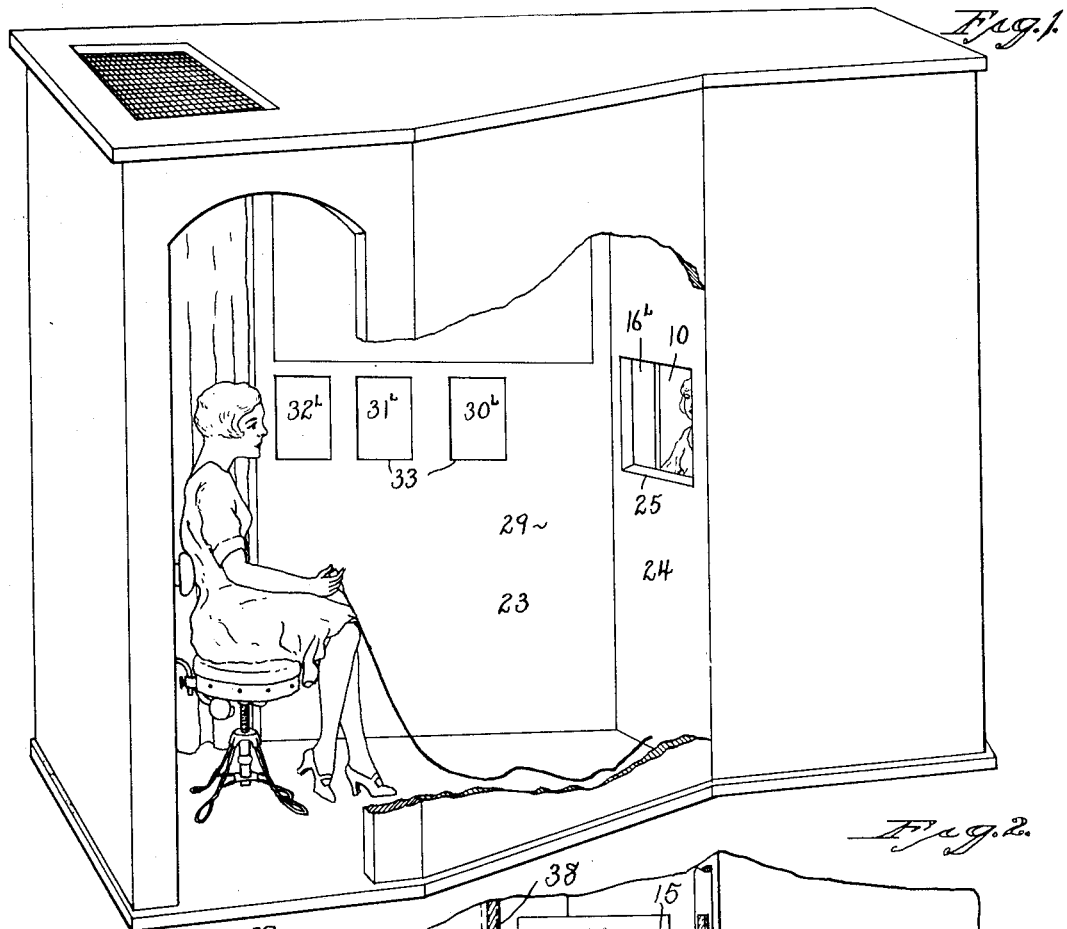
Fig. 1 is a perspective view of a photographic cabinet equipped with my improved pose-reflecting system, a portion of the side wall being broken away to expose the interior.

Fig. 4 is a view corresponding to Fig. 3 but showing the left-hand image-deflecting mirror swung inward to deflect an image against any one of the three left-hand sight-mirrors so that the poser may observe a reflection of his profile or semi-profile; and Fig. 5 is a detached perspective view of the unit comprising the central pose-reflecting mirror and the two pivotal image-deflecting mirrors, the said unit being mounted upon vertical guide-rods which are broken away.

In carrying out my invention as herein shown, I employ a centrally-arranged vertically-movable pose-reflecting mirror 10 formed about midway of its length with a slit-like aperture 11 and having secured to it, near each of its four corners, clips 12, the left-hand two of which are adapted to ride up and down upon a guide-rod 13 and the right-hand two of which are adapted to ride up and down upon a similar guide-rod 14.

Pivotally secured to each of the four clips 12 above mentioned is a bracket 15. The left-hand pair of brackets 15 have attached to them an image-deflecting mirror 16$^L$ and similarly the right-hand pair of brackets 15 have secured to them a complementary image-deflecting mirror 16$^R$, each of which mirrors is provided about midway of its length with a slit-like aperture 17 adapted to register with the aperture 11 in the pose-reflecting mirror 10.

The upper pair of brackets 15 are each formed with an offsetting-arm 18 to which is pivoted a link 19 by which the mirrors may be swung in a horizontal direction for the purpose as will hereinafter appear.

The pose-reflecting mirror 10 is interposed directly between the subject represented at 20 and a camera-lens 21 forming a feature of, and representing for purposes of description, the lens-system, whatever its character, of a camera 22, which latter may be of any approved type and requires no detailed description herein.

Spaced forward of the pose-reflecting mirror 10 sufficiently to permit the image-deflecting mirrors $16^L$ and $16^R$ to swing, is a V-shaped shield 23 having a flat apex 24 arranged in line with the mirror 10 and provided in its said flat apex with a rectangular sight-opening 25 through which the poser may see his reflection in the pose-reflecting mirror 10 which reflection is reduced in scale so as to be readily observed at a glance by a reducing-lens 26 positioned parallel with and closely adjacent the forward face of the said mirror 10 and mounted upon a vertical standard 27 upstanding from the base 28 of the apparatus.

Arranged back of the diverging left-hand reach 29 of the shield 23 are a series of three sight-mirrors $30^L$, $31^L$ and $32^L$ arranged at different angles so as to reflect to the poser an image of himself deflected by the image-deflecting mirror $16^L$ when the same is swung into the position in which it is shown in Fig. 4. Arranged in line with each of the sight-mirrors $30^L$, $31^L$ and $32^L$ is a sight-opening 33 formed in the diverging left-hand reach 29 of the shield 23.

The sight-mirror $32^L$ is fixed in position upon a shelf 34 supported between the outer end of the shield 23 and the outer wall 35 of the cabinet. Each of the mirrors $30^L$ and $31^L$ are secured in U-shaped frames 36 which are adapted to slide upon vertically-arranged square guide-rods 37 for the purpose as will hereinafter appear.

For the purpose of raising and lowering the mirrors $30^L$ and $31^L$ upon their respective guide-rods 37 I attach to the frame 36 of each of them a cable 38 which may lead to any convenient point for manipulation by the operator of the apparatus. A reducing-lens 39 is positioned so as to reduce the image deflected by the mirror $16^L$ when it is in the position shown in Fig. 4 before the image reaches any one of the sight-mirrors $30^L$, $31^L$ and $32^L$.

Back of the right-hand reach 40 of the shield 23 I mount a series of obliquely-disposed sight-mirrors $30^R$, $31^R$ and $32^R$ respectively corresponding to the mirrors $30^L$, $31^L$ and $32^L$ before referred to and adapted to reflect to the poser the image of himself received from the image-deflecting mirror $16^R$ when the same is in the position indicated by broken lines in Fig. 4.

Formed in the reach 40 of the shield 23 in line with each of the sight-mirrors $30^R$, $31^R$ and $32^R$ are sight-openings 33. Each of the mirrors referred to is mounted in the same manner as the mirrors $30^L$, $31^L$ and $32^L$ and the parts bear corresponding numbers in the drawings.

A reducing-lens 44 is positioned so as to reduce the image deflected to the said mirrors $30^R$, $31^R$ and $32^R$ by the image-deflecting mirror $16^R$ when the same is in the position indicated by broken lines in Fig. 4.

It will thus appear that the arrangement of parts upon either side of the axis of the apparatus correspond, so that the poser may view any one of a variety of reduced-scale images of himself, either right or left or full-face, which the camera 22 will record when permitted to do so, as will hereinafter appear.

Presuming that the poser desired to have the camera record a full-face view of himself, both of the image-deflecting mirrors $16^L$ and $16^R$ will be swung out of his line of vision into the positions shown in Fig. 3, and the mirror 10 will be adjusted vertically so that that portion of its reflecting surfaces lying below its aperture 11 will be interposed between the poser and the camera. With the parts in the positions just described, the poser will see through the opening 25 and the reducing-lens 26, a reduced-scale reflection of the image of himself which the camera 22 will record when permitted to do so, as will now appear.

Figure 2:
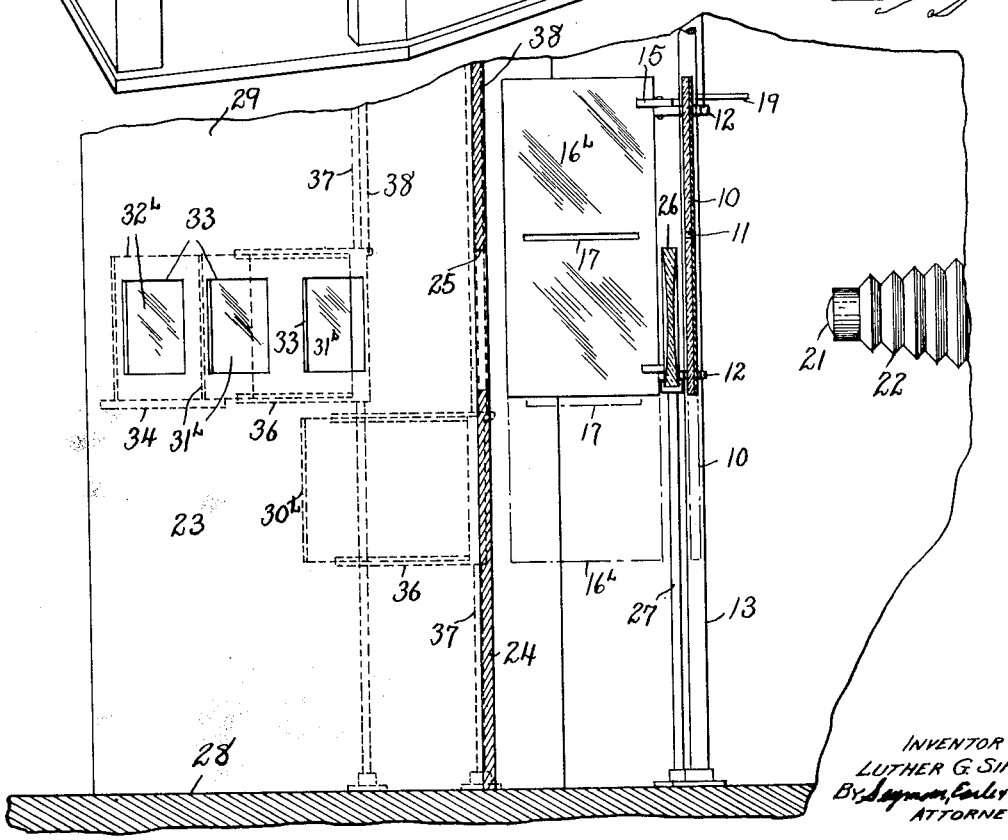
Fig. 2 is a schematic vertical longitudinal sectional view of a pose-reflecting system embodying my invention, the parts being shown in the positions due them when the poser desires a reflection of a full-face image.

After the poser has satisfied himself as to the desirability of his pose, as he sees it reflected from that section of the mirror 10 lying below the aperture 11, the said mirror is moved rapidly downward from the position in which it is shown in full lines in Fig. 2 to the position in which it is shown by broken lines in the same figure, by any suitable mechanism, or permitted to drop by gravity, if desired. The image-deflecting mirrors $16^L$ and $16^R$, now in their retired position, will of course accompany the mirror 10 in this downward movement.

The downward movement of the mirror 10, as just above described, causes the aperture 11 therein to pass by the lens 21 of the camera 22 and so permit the same to record the identical image which the poser is at the time observing in the mirror 10.

Should the poser desire to have the camera record a right-side view of himself in profile or semi-profile, the image-deflecting mirror $16^L$ will be swung inward into the position in which it is shown in Fig. 4 and positioned vertically so that that area of its reflecting surface lying below its aperture 17 will be in line with the opening 25 in the shield 23.

With the image-deflecting mirror $16^L$ in the position just described, it will serve to deflect the image of the poser into any one of the three left-hand sight-mirrors $30^L$, $31^L$ and $32^L$, as may be desired. If the poser desires to turn his head far to the left, so as to present the right side of his face more fully to the camera, he will select the sight-mirror $32^L$ as the point to observe the reflected image of himself. To permit the poser to see his image in the sight-mirror $32^L$, the intervening sight-mirrors $30^L$ and $31^L$ will be lowered upon their guide-rods 37, out of line with the mirror 32^L.

If the poser desires to observe his reflection in the mirror 31^L, it will be only necessary to lower the mirror 30^L, or if he desires to view himself in the mirror 30^L it will be unnecessary to depress any of the mirrors.

When the poser has satisfied himself as to the desirability of his pose as he views it in any one of the sight-mirrors 30^L, 31^L and 32^L, the mirror-unit comprising the mirrors 10, 16^R and 16^L will be moved rapidly downward so as to cause the now aligned apertures 17 of the mirror 16^L and the aperture 11 of the mirror 10 to pass by the lens 21 of the camera and so permit the same to record the identical image which the sitter is at the time observing in the particular left-hand sight-mirror which he has chosen.

Should the poser desire to have the camera record a view, wholly or partially, of the left side of his face, the image-deflecting mirror 16^L will be moved into its retired position and the complementary mirror 16^R will be swung into the position in which it is shown by broken lines in Fig. 4 and that portion of its area lying below its aperture 17 will be aligned with the opening 25. The same procedure as that described for observing and recording the image of the right side of his face may now be followed through.

From the foregoing it will be seen that by means of my improved pose-reflecting system, the poser may observe before his photograph is recorded, any one of a variety of views of himself. The particular apparatus chosen for the illustration of my invention herein enables the poser to observe any one of seven distinct reflections of himself.

It will be noted that after the mirrors 10, 16^L or 16^R have moved vertically to permit the camera 22 to record a given pose through any one or more of the apertures 11 and 17 as the case may be, the reflecting areas of the said mirrors lying above their respective apertures will come into registration with the poser's line of vision, so that he is but slightly, if at all, aware of the fact that the given mirror has moved vertically. In other words, the poser can still see his reflection after the photograph has been taken and he is virtually unaware, as far as visual evidence is concerned, that either of the image-deflecting mirrors 16^L or 16^R or the mirror 10 has moved.

I claim:

1. In a pose-reflecting system for photographic apparatus, the combination with a camera; of an image-deflecting mirror mounted for bodily movement and for swinging movement in a horizontal direction and adapted to be interposed between the sensitized material in the said camera and the subject to prevent the image of the said subject from being recorded by the said camera and bodily movable from said normal position to permit the said image to be recorded by the said camera, and laterally adjustable in a horizontal direction for deflecting the image of the subject forward and to one side; and a sight-mirror visible to the subject and located to one side and forward of the said image-deflecting mirror in position to receive and reflect an image therefrom to the subject; whereby a person to be photographed may observe beforehand in the said sight-mirror a reflection of substantially the exact profile or semi-profile image of himself which the said camera will record.

2. In a pose-reflecting system for photographic apparatus, the combination with a camera; of an image-deflecting mirror formed with an aperture and mounted for bodily movement and for swinging movement in a horizontal direction and adapted to be interposed between the sensitized material in the said camera and the subject to prevent the image of the said subject from being recorded by the said camera and bodily movable from said normal position to permit the said image to be recorded through the said aperture by the said camera, and laterally adjustable in a horizontal direction for deflecting the image of the subject forward and to one side; and a sight-mirror visible to the subject and located to one side and forward of the said image-deflecting mirror in position to receive and reflect an image thereupon to the subject; whereby a person to be photographed may observe beforehand in the said sight-mirror a reflection of substantially the exact profile or semi-profile image of himself which the said camera will record.

3. In a pose-reflecting system for photographic apparatus, the combination with a camera; of an image-deflecting mirror mounted for bodily movement and for swinging movement in a horizontal direction and adapted to be interposed between the sensitized material in the said camera and the subject to prevent the image of the said subject from being recorded by the said camera and bodily movable from said normal position to permit the said image to be recorded by the said camera, and laterally adjustable in a horizontal direction for deflecting the image of the subject forward and to one side; and two sight-mirrors arranged horizontally in line and positioned to one side and at different distances forward of the said image-deflecting mirror and in view of the subject, the sight-mirror nearest the said image-deflecting mirror being movable into an inoperative position to permit an image to be reflected into a more distant sight-mirror.

4. In a pose-reflecting system for photographic apparatus, the combination with a camera; of a movable pose-reflecting mirror adapted to be interposed between sensitized material in the said camera and the subject to prevent the image of the said subject from being recorded by the camera and bodily movable from said normal position to permit the said image to be recorded by the said camera; an image-deflecting mirror coupled to the said pose-reflecting mirror for movement therewith and pivotally mounted with respect thereto for swinging movement in a horizontal direction into a position in front of the said pose-reflecting mirror at an angle required to deflect an image forward and to one side thereof; and a sight-mirror visible to the subject and located to one side and forward of the said image-deflecting mirror in position to receive and reflect an image therefrom to the subject; whereby a person to be photographed may observe beforehand in the said sight-mirror a reflection of substantially the exact profile or semi-profile image of himself which the said camera will record.

5. In a pose-reflecting system for photographic apparatus, the combination with a camera; of a movable pose-reflecting mirror formed with an aperture and adapted to be interposed between the sensitized material in the said camera and the subject to prevent the image of the said subject from being recorded by the camera and bodily movable from said normal position to permit the said image to be recorded through the said aperture by the said camera; an image-deflecting mirror coupled to the said pose-reflecting mirror for movement therewith and pivotally mounted with respect thereto for swinging movement in a horizontal direction into a position in front of the said pose-reflecting mirror at an angle required to deflect an image forward and to one side thereof and also formed with an aperture horizontally in line with the aperture in the said pose-reflecting mirror; and a sight-mirror visible to the subject and located to one side and forward of the said image-deflecting mirror in position to receive and reflect an image therefrom to the subject; whereby a person to be photographed may observe beforehand in the said sight-mirror a reflection of substantially the exact profile or semi-profile image of himself which the said camera will record.

6. In a pose-reflecting system for photographic apparatus, the combination with a camera; of a movable pose-reflecting mirror adapted to be interposed between sensitized material in the said camera and the subject to prevent the image of the said subject from being recorded by the camera and bodily movable from said normal position to permit the said image to be recorded by the said camera; a pair of image-deflecting mirrors organized as a unit with the said pose-reflecting mirror for movement therewith and pivotally mounted adjacent the respective opposite sides thereof for swinging movement into a position in front of the said pose-reflecting mirror at an angle required to deflect an image forward and to one side thereof; and a sight-mirror visible to the subject and located forward of and on each of the opposite sides of the said pose-reflecting mirror in position to receive and reflect images from the said image-reflecting mirrors to the subject.

7. In a pose-reflecting system for photographic apparatus, the combination with a camera; of a movable pose-reflecting mirror formed with an aperture and adapted to be interposed between the sensitized material in the said camera and the subject to prevent the image of the said subject from being recorded by the camera and bodily movable from said normal position to permit the said image to be recorded through the said aperture by the said camera; a pair of image-deflecting mirrors, each provided with an aperture and organized as a unit with the said pose-reflecting mirror for movement therewith and pivotally mounted adjacent the respective opposite sides thereof for swinging movement into a position in front of the said pose-reflecting mirror at an angle required to deflect an image forward and to one side thereof and for registering its aperture with the aperture of the said pose-reflecting mirror; and a sight-mirror visible to the subject and located forward of and on each of the opposite sides of the said pose-reflecting mirror in position to receive and reflect images from the said image-deflecting mirrors to the subject.

8. A pose-reflecting system for photographic apparatus as defined in claim 1 and having the parts organized so that bodily movement of the image-deflecting mirror is in a substantially vertical direction and hence in a plane substantially at a right angle to the plane in which the same swings.

9. In a pose-reflecting system for photographic apparatus, the combination with a camera; of an image-deflecting mirror adapted to be interposed in the light-path between the subject and the sensitized material in the said camera and mounted for movement from such interposed position to permit the image of the subject to be recorded by the said camera and also movable into position to deflect the said image forwardly and to one side; and a sight-mirror visible to the subject and located forwardly and to one side of the said image-deflecting mirror to receive and reflect an image therefrom to the subject.

10. In a pose-reflecting system for photographic apparatus, the combination with a camera; of a movable pose-reflecting mirror adapted to be interposed in the light-path between the subject and the sensitized material in the said camera and movable from such interposed position to permit the image of the subject to be recorded by the said camera; an image-deflecting mirror adapted to be moved in front of the said pose-reflecting mirror into position to deflect the image of the subject forwardly and to one side; and a sight-mirror visible to the subject and located forwardly and to one side of the said pose-reflecting and image-deflecting mirrors to receive and reflect an image from the latter to the subject.

In testimony whereof, I have signed this specification.

LUTHER G. SIMJIAN.